Patented May 8, 1934

1,957,461

UNITED STATES PATENT OFFICE 1,957,461

ACETYL-CHOLINE SALTS, DIMETHYL-AMINO-ETHYL ACETATE, AND PROCESS FOR THEIR PRODUCTION

Lauder W. Jones, Princeton, and Randolph T. Major, Westfield, N. J.; said Major assignor to Merck & Co., Inc., Rahway, N. J., a corporation of New Jersey No Drawing. Application April 11, 1931, Serial No. 529,542

9 Claims. (Cl. 260—25)

The invention covered by this application relates, in general, to improvements in certain choline esters and their salts and to improved processes for their production. A specific object of the present invention is to produce certain acetyl-choline halides in substantially pure form and as isolated compounds suitable for medicinal use. Another object is to produce dimethyl-amino-ethyl acetate which serves as an intermediate for the process of producing the choline preparations herein contemplated and for other purposes. Further objects will become apparent as the subject matter of this application will be better understood.

Choline and its esters have achieved considerable importance in recent years due to their recognized property of producing marked vasodilation. It has been known that choline and some of its compounds are normally present in the serous coat of the intestine and that they are probably the normal peristaltic hormones. The acetyl derivative of choline is especially interesting since it has been found that it possesses a depressor effect 100,000 times as great as that produced by choline itself and yet is only about three times as toxic as that substance.

It is also known that some salts of acetyl-choline exist in certain natural products as, for instance, as reported by Ewins [Biochem J., 8, 44 (1914)], Borutau and Cappenburg, [Arch Pharm. 259, 33 (1921)], and in Chemical Abstracts 15, 2692 (1921). Methods for synthetizing a number of such compounds have also been developed by various investigators, although it appears that generally the inventors have not been successful in isolating and directly defining the products synthetized. Baeyer, in 1867, (Annalen, 142, p. 325) and later Nothnagel, in 1894, (Arch. Pharm. 232, p. 265) synthetized preparations which were understood to contain acetyl choline chloride. Their process consisted of synthetizing this compound by acetylating choline chloride with acetyl chloride. They obtained their product in the form of an oily substance, but were not able to produce the pure salt therefrom. Fourneau and Page, (Bull. Soc. Chim. [4] vol. 15, 1914, p. 552) following this work, also undertook to produce this compound, and in 1914, reported that they had succeeded. They treated trimethylamine with chloro-ethyl acetate, but were unsuccessful in their efforts to isolate the pure chloride of acetyl choline. Hunt, in 1915 (Journ. Pharmacol., vol. 7, p. 306) and thereafter, studied pharmacologically the effect of solutions containing choline and its compounds and reported that he had succeeded in forming acetyl-choline chloride in such solutions. It does not appear, however, that he at any time succeeded in isolating and defining the pure substance.

Such identification of the materials with which the previous investigators worked, as has been available up to the time of our invention, was based wholly either on biological tests or on indirect determinations of the properties of the double salts, chloro-aurate, chloro-platinate, etc.

We have now succeeded for the first time in synthetizing the acetyl-choline chloride and iodide, and in isolating these salts and determining their inherent physical and chemical properties directly from such isolated products.

In view of the interesting biological and pharmacological work which had been done with these choline compounds, as stated, we undertook to study processes for the production and isolation of the pure acetyl-choline salts, and more especially the chloride and the iodide, in order to determine their physical and chemical properties. We finally succeeded in developing a new method for synthetizing these halides. In the examples for applying this new synthetic process we shall explain the method for producing the iodide and subsequently converting this into the chloride, which enabled us to produce these particular salts for the first time in the form of white crystalline powder. The iodide and chloride thus formed have melting-points respectively of 160–162° C. and 151° C.

The new process in its entirety involves as a first step the production of dimethylamino-ethyl acetate and then reacting upon this by methyl halide with a resultant yield of acetyl-choline halide. For purposes of convenience the process was developed by the use of methyl iodide. From the iodide, the chloride is obtained by agitating an alcoholic solution of this iodide with silver chloride, as will be more fully shown in the exemplification of the several steps of the process.

By way of illustration of our new process for thus producing these isolated pure acetyl choline compounds, and for producing, as a first step, the dimethylamino-ethyl acetate use in its preparation, we present, as preferred forms, the following examples.

*Example I—Dimethylamino-ethyl acetate.—* To a solution of one molecular part of acetyl-chloride in anhydrous ether is slowly added, under a reflux condenser, one molecular part of dimethylamino-ethyl alcohol. After a vigorous reaction a white solid is formed. The reaction proceeds as follows:

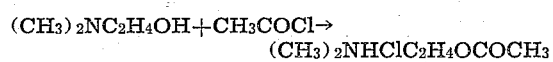
(CH$_3$)$_2$NC$_2$H$_4$OH+CH$_3$COCl→
(CH$_3$)$_2$NHClC$_2$H$_4$OCOCH$_3$ The solid is collected on a filter and dissolved in water. A small quantity of hydrochloric acid is added, and then the solution is extracted with ether. The addition of the hydrochloric acid is made in order more readily to hold all of the amine in the aqueous layer. More ether is then added, and while the solution is kept cold and stirred, it is made basic to phenolphthalein with potassium carbonate and a small quantity of caustic soda. Thereafter the ether layer is separated, and the water solution is repeatedly extracted with ether. The ether extracts are combined and dried with anhydrous potassium carbonate. Fractional distillation yields dimethyl-amino-ethyl acetate in the form of a colorless oil with a boiling point of 86–88° C. under 80 mm. Its hydrochloride, when reformed by passing dry hydrogen chloride into a solution in anhydrous ether, precipitates as a white, very hygroscopic solid. This, when recrystallized from hot absolute alcohol, has a melting point of 129–130° C.

The dimethylamino-ethyl acetate used in the first stage of the described processes has hitherto been prepared by methylating amino-ethyl acetate, but its physical and chemical properties have not been defined in literature. We have found it necessary, possible and desirable, for our purpose, to produce a dimethylamino-ethyl acetate in the manner, form, and quality as set forth in Example I, and have succeeded in determining the physical and chemical properties thereof as shown.

*Example II—Acetyl choline iodide.*—The iodide is produced by the reaction between equal molecular parts of dimethylamino-ethyl acetate and methyl iodide according to the equation

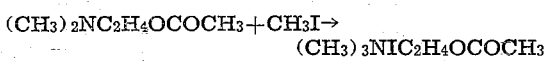
(CH$_3$)$_2$NC$_2$H$_4$OCOCH$_3$+CH$_3$I→
(CH$_3$)$_3$NIC$_2$H$_4$OCOCH$_3$ The dimethylamino-ethyl acetate is dissolved in dry ether and the methyl iodide added to this solution. A white solid is formed at once. This is recrystallized from hot absolute alcohol. It has a melting point of 160–162° C.

*Example III—Acetyl choline chloride.*—From the iodide, as prepared by the method of Example II, the chloride is formed. A concentrated solution of the iodide is made in warm absolute alcohol. This is shaken with a slight excess of silver chloride until the solution shows no further signs of the iodide ion. The silver salts formed in the reaction are removed by filtration and the acetyl choline chloride is precipitated as a white solid by adding anhydrous ether to the filtrate. The last traces of silver chloride are removed by adding the precipitate to a saturated solution of hydrogen sulphide in absolute alcohol. The residues of silver in the added choline salt precipitates out as silver sulphide, while the acetyl choline chloride is readily dissolved in the alcohol. In order to separate the silver sulphide more readily, activated charcoal, which has been previously washed with absolute alcohol, may be added, and the mixture shaken and filtered. The acetyl choline chloride is then reprecipitated from the filtrate with anhydrous ether.

The acetyl-choline chloride thus obtained is a white crystalline hygroscopic powder, very soluble in water and in alcohol, but insoluble in ether, and has a melting point of 151° C. The chloroplatinate is orange colored and melts at 227° C. with decomposition; the chloroaurate is orange colored and has a melting point of 168–169° C.

From the iodide of acetyl choline, salts, other than the chloride, may also be formed in a similar manner, by using appropriate salts of silver which are relatively more soluble in alcohol than is silver iodide. Thus acetyl-choline sulphate or phosphate, etc., may be produced by using, respectively, silver sulphate, phosphate, or other appropriate corresponding silver salts; and modifying other incidental steps of the process accordingly, as will readily suggest themselves to the chemist.

The foregoing examples, which are set forth as preferred and efficient means for applying these processes and producing the products of this invention are described by way of illustration and not of limitation, and may obviously be modified in certain particulars without departing from the scope and purposes of the present invention.

Having thus set forth the manner and means of carrying out this invention, we request the issuance of Letters Patent on the following claims:

1. In the process of producing salts of acetyl choline, the steps consisting of the preparation of dimethylamino-ethyl acetate by reacting upon dimethylamino-ethyl alcohol with acetyl chloride according to the equation

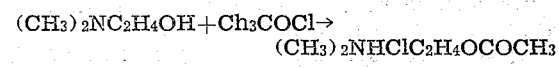
(CH$_3$)$_2$NC$_2$H$_4$OH+CH$_3$COCl→
(CH$_3$)$_2$NHClC$_2$H$_4$OCOCH$_3$ and subsequently converting the hydrochloride thus formed into free dimethylamino-ethyl acetate by the action of alkali.

2. The process of producing acetyl-choline iodide, comprising the steps of producing dimethylamino-ethyl acetate by reacting upon dimethylamino-ethyl alcohol with acetyl chloride for the formation of the hydrochloride of dimethylamino-ethyl acetate, the conversion of this hydrochloride to free dimethylamino-ethyl acetate by treatment with alkali, and then reacting upon the dimethylamino-ethyl acetate thus formed with methyl iodide.

3. The process of producing acetyl-choline chloride, comprising the steps of dissolving acetyl-choline iodide in warm absolute alcohol, shaking this solution with a slight excess of silver chloride until the solution gives no further test for the iodide ion, removing the silver salts formed by filtration and precipitating the formed chloride by adding anhydrous ether to the filtrate.

4. The process of purifying acetyl-choline chloride obtained by the process described in claim 3, consisting of redissolving this salt in absolute alcohol saturated with hydrogen sulphide, and reprecipitating the chloride by the addition of anhydrous ether.

5. The process of producing salts of acetyl-choline, comprising the steps of preparing a concentrated solution of acetyl-choline iodide, prepared according to the process described in claim 3, in warm absolute alcohol, shaking the solution with a slight excess of a silver salt of the acid corresponding to the desired salt until it yields no further test for the iodide ion, removing the remaining silver salts by filtration.

6. Acetyl-choline iodide of the formula (CH$_3$)$_3$NIC$_2$H$_4$OCOCH$_3$ in the form of white hygroscopic crystals having a melting point of 160–162° C., soluble in water and in absolute alcohol and insoluble in anhydrous ether.

7. Acetyl-choline chloride of the formula (CH$_3$)$_3$NClC$_2$H$_4$OCOCH$_3$ in the form of white hygroscopic crystals having a melting point of 151° C., soluble in water and in absolute alcohol and insoluble in anhydrous ether.

8. As a new product, dimethylamino-ethyl acetate, of a degree of purity suitable as a reagent for chemical synthetic processes, having the formula $(CH_3)_2NC_2H_4OCOCH_3$ in the form of a colorless oil with a boiling-point of 86–88° C. under 80 mm., and whose hydrochloride forms a white hygroscopic solid with a melting point of 129–130° C.

9. The process of producing salts of acetyl choline comprising the steps of preparing dimethylamino-ethyl acetate by reacting upon dimethylamino-ethyl alcohol with acetyl chloride to produce the hydrochloride, and forming therefrom the free dimethylamino-ethyl acetate by the action of alkali; reacting upon the dimethylamino-ethyl acetate with methyl iodide to produce acetyl choline iodide; and thereafter to produce other salts of acetyl choline by acting upon a solution of acetyl choline iodide with a corresponding silver salt.

LAUDER W. JONES.
RANDOLPH T. MAJOR.